United States Patent
Nagamatsu et al.

(10) Patent No.: US 9,018,278 B2
(45) Date of Patent: Apr. 28, 2015

(54) SURFACE TREATED CALCIUM CARBONATE FILLER FOR RESIN AND RESIN COMPOSITION CONTAINING THE FILLER

(75) Inventors: Makoto Nagamatsu, Hyogo (JP); Hidemitsu Kasahara, Hyogo (JP); Kouhei Sako, Hyogo (JP); Hisakazu Hojo, Hyogo (JP)

(73) Assignee: Maruo Calcium Co., Ltd., Akashi-Shi, Hyogo (JP)

( * ) Notice: Subject to any disclaimer, the term of this patent is extended or adjusted under 35 U.S.C. 154(b) by 125 days.

(21) Appl. No.: 13/574,867

(22) PCT Filed: Jan. 29, 2010

(86) PCT No.: PCT/JP2010/051249
§ 371 (c)(1), (2), (4) Date: Jul. 24, 2012

(87) PCT Pub. No.: WO2011/092844
PCT Pub. Date: Aug. 4, 2011

(65) Prior Publication Data
US 2012/0283368 A1 Nov. 8, 2012

(51) Int. Cl.
| | | |
|---|---|---|
| C08K 9/00 | (2006.01) | |
| C08G 18/48 | (2006.01) | |
| C08K 9/04 | (2006.01) | |
| C08L 23/02 | (2006.01) | |
| G02B 5/08 | (2006.01) | |
| F21V 7/22 | (2006.01) | |

(52) U.S. Cl.
CPC . *C08K 9/04* (2013.01); *C08L 23/02* (2013.01); *G02B 5/0808* (2013.01); *F21V 7/22* (2013.01)

(58) Field of Classification Search
CPC ..... C08L 23/025; C08L 23/00; C08K 3/0033; C08K 5/5317

USPC .......... 523/200, 205; 524/130, 322; 106/405; 428/402
See application file for complete search history.

(56) References Cited

U.S. PATENT DOCUMENTS

| | | | |
|---|---|---|---|
| 7,977,410 B2 * | 7/2011 | Nagamatsu et al. | 523/205 |
| 2008/0182933 A1 * | 7/2008 | Shimizu et al. | 524/543 |

FOREIGN PATENT DOCUMENTS

| | | |
|---|---|---|
| JP | 60-166221 | 8/1985 |
| JP | 01-252525 | 10/1989 |
| JP | 10-072215 | 3/1998 |
| JP | 2002-264208 | 9/2002 |
| JP | 2002-333511 | 11/2002 |
| JP | 2002-363443 | 12/2002 |
| JP | 2004-157409 | 6/2004 |
| JP | 2006-169421 | 6/2006 |

* cited by examiner

*Primary Examiner* — Hannah Pak
(74) *Attorney, Agent, or Firm* — Kratz, Quintos & Hanson, LLP

(57) ABSTRACT

Provided is a surface treated calcium carbonate filler for resins, which comprises calcium carbonate particles, the surface of which has been treated with at least one surface active agent (A) selected from the group consisting of saturated fatty acids, unsaturated fatty acids, alicyclic carboxylic acids, resin acids, and salts thereof and with at least one compound (B) having the ability to chelate alkaline earth metals, the compound (B) being selected from the group consisting of phosphonic acids, polycarboxylic acids, and salts thereof. The surface treated calcium carbonate filler for resins of the present invention deteriorates little with time, has satisfactory dispersibility in resins, and can give a sheet or film which has a satisfactory balance among durability, weatherability, strength, and thermal stability, and is useful as a battery separator or a light reflector.

4 Claims, 1 Drawing Sheet

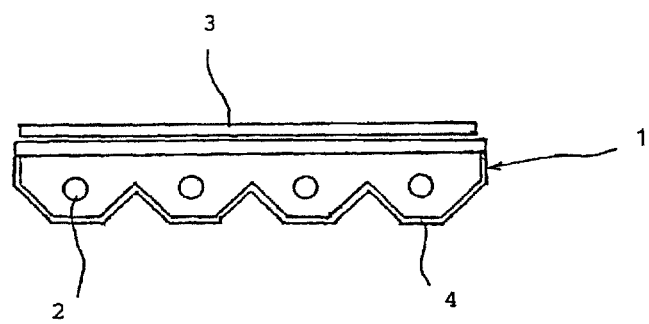

SURFACE TREATED CALCIUM CARBONATE FILLER FOR RESIN AND RESIN COMPOSITION CONTAINING THE FILLER

TECHNICAL FIELD

The present invention relates to a surface treated calcium filler for resins and a resin composition containing the filler. The surface treated calcium filler for resins of the present invention has excellent dispersibility, and therefore when added to a porous film, for example, distribution width of pore diameter is homogeneous and also the pore diameter is controllable. Therefore, it is useful as a surface treated calcium carbonate filler for resins that is used for an electric member like a capacitor and a battery separator or a light reflector for a liquid crystal display of a cellular phone, a notebook computer, and a television.

BACKGROUND ART

A porous resin film has been conventionally used as a filtration material for water purifiers, air purifiers and the like, clothing, synthetic paper, sanitary materials, medical materials, construction materials, electronic materials, air permeation sheets for agriculture, optical light reflectors for liquid crystal display, solar power generator, and the like, separators for batteries, separators for electrolytic capacitors and the like, and it has been desired to further improve and develop such a resin film for making the film thin and the durability in all of these applications.

For example, a lithium secondary battery, which has been used in electric instruments or mobile instruments such as cellular phones and notebook computers, has a high energy density, and therefore the lithium secondary battery have been increasingly expanded in production and consumption since it was commercially made available in the beginning of 1990s. Further, in recent days, studies are made to use the lithium secondary battery not only as a main power source for the people's livelihood, but also as a substitute for a lead battery installed in a vehicle, and therefore it is now required more than ever to have improved properties and safety. As such, physical properties of a separator made of a porous resin film are also required to have better performances like ion permeability and strength, and higher safety.

For example, a method was proposed for obtaining a porous film by stretching a film-like material comprising a resin composition containing a thermoplastic resin and a filler in TD direction by using a stretching device having a preheating part, a stretching part, and a heat treatment part (Patent Document 1).

On the other hand, in the field of light reflector, although a polyolefin film is used for a monitor of a personal computer, a thin-screen liquid crystalline television, a cellular phone, and a portable game machine, it is being attempted to have a small weight and a thin film and also a polyolefin film having higher stability with time and light reflection rate is needed.

In this regard, a reflector comprising a laminate made of a porous resin sheet consisting of a polyolefin resin and an inorganic filler, and a support is suggested (Patent Document 2).

Further, an inorganic filler in which the surface of inorganic particles is treated with a surface active agent (A) and a compound (B) having an ability to chelate alkaline metals, and a resin composition added with the filler are suggested (Patent Document 3).

PRIOR ART DOCUMENTS

Patent Documents

Patent Document 1: JP 2002-264208 A
Patent Document 2: JP 2004-157409 A
Patent Document 3: JP 2002-363443 A

SUMMARY OF THE INVENTION

Problems to be Solved by the Invention

Although the porous film obtained by the method disclosed in Patent Document 1 can give a porous film having high evenness and low variation in stretch, the reflector of Patent Document 2 has excellent heat resistance and bending processability, and the surface treated inorganic filler of Patent Document 3 can provide a film with favorable appearance and physical properties as being easily mixable with a resin and having little clogging and little agglomerates on a strainer of a kneading extruder, it is difficult to say that they are fully satisfactory in terms of durability, strength, and stability with time.

Under the above circumstances, an object of the present invention is to provide a surface treated calcium carbonate filler for resins having improved durability, strength and stability with time to solve the problems of the conventional techniques, and also to provide a resin composition and a battery separator or a light reflector containing the filler.

Solutions to the Problems

As a result of an intensive series of studies to achieve the purposes described above, the inventors of the present invention found that, by using a specific surface active agent (A) and a specific chelate compound (B) having the ability to chelate alkaline earth metals, a surface treated calcium carbonate filler for resins with very high dispersibility can be obtained, and when it is used for a battery separator or a light reflector, not only the performances required for each specific use but also durability, strength, or stability with time is improved, and thus completed the present invention.

Thus, the first aspect of the present invention relates to a surface treated calcium carbonate filler for resins which comprises calcium carbonate particles, the surface of which has been treated with at least one surface active agent (A) selected from the group consisting of saturated fatty acids, unsaturated fatty acids, alicyclic carboxylic acids, resin acids, and salts thereof and with at least one compound (B) having the ability to chelate alkaline earth metals, the compound (B) being selected from the group consisting of phosphonic acids, polycarboxylic acids, and salts thereof.

The second aspect of the present invention relates to the surface treated calcium carbonate filler for resins in which the surface active agent (A) is selected from the group consisting of saturated fatty acids and salts thereof.

The third aspect of the present invention relates to a resin composition which contains in a resin the surface treated calcium carbonate filler for resins as above-mentioned.

The fourth aspect of the present invention relates to the resin composition in which the resin is a polyolefin resin.

The fifth aspect of the present invention relates to a battery separator which comprises the resin composition as above-mentioned.

The sixth aspect of the present invention relates to a light reflector which comprises the resin composition as above-mentioned.

Effects of the Invention

The surface treated calcium carbonate filler for resins of the present invention has high dispersibility in resins, and can provide a resin composition having excellent durability, strength, and stability with time.

BRIEF DESCRIPTION OF THE DRAWINGS

FIG. 1 is a schematic drawing for illustrating a direct-lighting type surface light source display device which is used for evaluation of brightness variation.

EMBODIMENTS OF THE INVENTION

The surface treated calcium carbonate filler for resins according to the present invention comprises calcium carbonate particles, the surface of which has been treated with at least one surface active agent (A) selected from the group consisting of saturated fatty acids, unsaturated fatty acids, alicyclic carboxylic acids, resin acids, and salts thereof and with at least one compound (B) having the ability to chelate alkaline earth metals, the compound (B) being selected from the group consisting of phosphonic acids, polycarboxylic acids, and salts thereof.

Meanwhile, the surface treatment described in the present invention indicates a coating treatment.

The surface active agent (A) used for the surface treatment of calcium carbonate particles needs to be selected from saturated fatty acids, unsaturated fatty acids, alicyclic carboxylic acids, resin acids, and salts thereof. It may be used either singly or in combination of two or more, if necessary.

Examples of the saturated fatty acids include capric acid, lauric acid, myristic acid, palmitic acid, and stearic acid, and examples of the unsaturated fatty acids include oleic acid, linoleic acid, and linolenic acid. Both of them generally have 10 to 18 carbon atoms.

Examples of the alicyclic carboxylic acids include naphthenic acids having carboxyl groups at terminals of a cyclopentane ring or a cyclohexane ring. Examples of the resin acids include abietic acid, pimaric acid, and neoabietic acid.

Examples of the salts of saturated fatty acids, unsaturated fatty acids, alicyclic carboxylic acids, and resin acids include an alkali metal salt like potassium salt or sodium salt and an ammonium salt.

Among the surface active agents (A) described above, the saturated fatty acids or salts thereof are preferable from the view point of durability and heat resistance, which are the purpose of the present invention. Further, lauric acid or the like having small carbon number has a short chain length, and thus can easily enter small spaces among calcium carbonate particles. Thus, having an effect of enhancing the dispersibility of calcium carbonate, it is preferably used.

The amount of the surface active agent (A) for surface treatment of calcium carbonate varies in accordance with the specific surface area of calcium carbonate and in general, the use amount is increased more as the calcium carbonate has a higher specific surface area. It also varies depending on various physical properties such as MI value of the resin and various conditions like a lubricant to be added at the time of compounding, and therefore it cannot be defined uniformly. However in general, the use amount is 0.1 to 15% by weight to the weight of the calcium carbonate particles.

If the use amount is less than 0.1% by weight, it is difficult to obtain a sufficient dispersion effect. On the other hand, if it exceeds 15% by weight, bleeding from the porous film and a decrease in the strength or heat resistance of the porous film tend to be easily caused. Thus, it is preferably 0.5 to 4% by weight, and more preferably 1 to 3% by weight.

The compound (B) having the ability to chelate alkaline earth metals, that is used for surface treatment of calcium carbonate particles, needs to be selected from phosphonic acids, polycarboxylic acids, and salts thereof. It may be used either singly or in combination of two or more, if necessary. Having both functions of chelating to calcium carbonate particles and dispersing calcium carbonate particles, it can effectively exhibit the effects that are desired in the present invention.

Examples of the phosphonic acid include 1-hydroxy ethylidene-1,1-diphosphonic acid (HEDP), aminotrimethylene phosphonic acid (ATMP), nitrilotrismethylene phosphonic acid (NTMP), phosphonobutane tricarboxylic acid (PBTC), and phosphonomethylethylene diamine (EDTMP).

Examples of the polycarboxylic acid include polyacrylic acid and salts thereof. Examples of the copolymers include copolymers of acrylic acid and maleic acid (polymerization ratio 100:80 or the like) and salts thereof, and water soluble polycarboxylic acid represented by polymaleic acid and polyitaconic acid and salts thereof.

Examples of the phosphonic acid or polycarboxylic acid salts include an alkali metal salt like potassium salt or sodium salt and an ammonium salt.

Among the chelate compounds (B) described above, phosphonic acid has higher chelating ability to calcium carbonate than carboxylic acid and is thus more effective for enhancing the dispersibility of calcium carbonate filler in the resin and durability or heat resistance of a resin composition, and therefore it can be used preferably.

Among them, nitrilotrismethylene sulfonic acid or salts thereof can be preferably used in that it hardly causes a trouble like torque increase or burn mark during kneading of resin and it is also favorable from the view point of handling property.

Meanwhile, examples of the compound having the ability to chelate alkaline earth metals include, as described in JP 2002-363443 A, aminocarboxylic acid represented by ethylenediamine tetraacetic acid, nitrilotriacetic acid, hydroxyethyl ethylenediamine triacetic acid, diethylenetriamine pentaacetic acid, and triethylenetetramine hexaacetic acid, hydroxyethylidene diphosphorous acid, water treatment agents including aluminum compounds like polyaluminum chloride, and phosphoric acids represented by polyphosphoric acid and condensed phosphoric acid and their salts. However, as having insufficient stability with time, heat stability, or dispersion stability, they cannot be used for the present invention.

The amount of the chelate compound (B) used for surface treatment of calcium carbonate varies in accordance with the specific surface area of calcium carbonate or compound conditions, similarly to the surface active agent (A). Thus, it cannot be defined uniformly. However in general, the use amount is preferably 0.001 to 5% by weight to the weight of the calcium carbonate.

If the use amount is less than 0.001% by weight, it is difficult to obtain a sufficient dispersion effect. On the other hand, even when it is added in an amount of more than 5% by weight, no additional improvement can be obtained.

The calcium carbonate that can be used for the present invention is not specifically limited. However, synthetic calcium carbonate prepared by carbonic acid gas carbonization, which is fine particles and has uniform particle diameter and shape, can be preferably used.

The limestone as a raw material is preferably selected after carefully considering the impurities contained therein. At the time of firing, as the fuel, generally cokes, crude oil, light oil, kerosene, or the like is used, but if it is allowed in terms of cost, light oil and kerosene are preferably used for firing from the view point of impurities.

The lime milk or the calcium carbonate particles obtained by the reaction of lime milk are preferably subjected to classification by gravitational decantation, centrifugation and flotation, and further a sieve, a filter or the like in order to remove impurities and coarse particles when the particles are in the state of a water slurry.

Further, it is also preferable that calcium carbonate powder obtained after drying and pulverization or a surface treated calcium carbonate powder is also subjected to classification like air classification or the like to remove agglomerates generated during the drying step.

Additionally, dust and powder (of carbon and fine metals) in atmospheric air to be used in air classification, drying, or in the air transport or storage during production steps are also affecting factors in the case of applications where an insulating property is required. Therefore, it is effective to take a countermeasure of removing them by using various kinds of filters.

In the surface treatment with the above-mentioned surface active agent (A) and the compound (B) having the ability to chelate alkaline earth metals, a surface treatment method to be employed may be a generally so-called dry treatment method involving directly mixing the surface treatment agents to a powder using a mixer such as a Super mixer or a Henschel mixer, optionally in a heating condition, a generally so-called wet treatment method involving dissolving the surface active agent and compound (B) having the ability to chelate alkaline earth metals in water or hot water, adding the obtained solution to a water slurry containing calcium carbonate with stirring for surface treatment and then carrying out dehydration and drying, and a method combining both methods. In terms of the treatment extent of the calcium carbonate particle surfaces and the cost, typically the wet treatment method alone is preferably employed.

The surface treated calcium carbonate filler for resins of the present invention can be produced according to the method described above. However, when it is used particularly as a filler for a porous resin among the resins, it preferably also has the physical properties (a) to (d) of powder described below:

(a) $0.1 \leq D50 \leq 1.0$ (μm)
(b) $Da \leq 5$ (μm)
(c) $3 \leq Sw \leq 60$ (m$^2$/g)
(d) $0.05 \leq As \leq 0.3$ (mg/m$^2$)

in which,

D50: average particle diameter (μm) of particles in 50% cumulative total by weight from the larger particle side in particle size distribution by laser diffraction spectrometry (MASTERSIZER 2000, manufactured by Malvern Instruments Ltd.);

Da: maximum particle diameter (μm) in the particle size distribution by laser diffraction spectrometry (MASTERSIZER 2000, manufactured by Malvern Instruments Ltd.);

Sw: BET specific surface area (m$^2$/g) measured by nitrogen adsorption method; and As: surface treatment ratio per unit specific surface area calculated according to the following formula:

$$\{\text{heat loss per 1 g of surface treated calcium carbonate at a temperature in the range of from 200° C. to 500° C. (mg/g)}\}/Sw\ (g/m^2).$$

The formulae (a) and (b) are indexes for indicating the dispersion state of the surface treated calcium carbonate filler for resins of the present invention.

In the formula (a), it is preferable that the average particle diameter (D50) measured by MASTERSIZER 2000 is in the range of from 0.1 to 1.0 μm. It is possible technically to control the average particle diameter (D50) to be smaller than 0.1 μm, however, it is undesirable in terms of the cost. On the other hand, if it exceeds 1.0 μm, the cohesive power of secondary particles, which are agglomerates of the primary particles, becomes high and part of the particles exist as being the secondary particles even in a resin. Consequently, they may cause generation of voids having a size larger than the desired size in a light reflecting porous film or a battery separator film, for example, and as a result, the variation or decrease in reflected light and reduction in strength of a separator film may easily occur, and is therefore undesirable.

Since the void ratio in a battery separator is as high as 50% or so and, under high pressure condition, ions travel with higher flow rate across the separator. Thus, as resin strength, even higher strength is required, and therefore it is preferable for the particles to have dispersibility more close to that of the primary particles. For such reasons, the average particle diameter is preferably in the range of from 0.1 to 0.8 μm and more preferably in the range of from 0.1 to 0.5 μm.

In the formula (b), it is required that the maximum particle diameter (Da) measured by MASTERSIZER 2000 is 5 μm or smaller. If the maximum particle diameter (Da) exceeds 5 μm, a problem that pores larger than desired ones are formed is caused when it is used for a battery separator, for example, and as a result, the variation or decrease in reflected light of a light reflection film or reduction in strength or breakage of a separator film may easily occur, and that is therefore undesirable. More preferably, the maximum particle diameter is 3 μm or smaller, and still more preferably 1 μm or smaller.

The measurement method of the average particle diameter (D50) and the maximum particle diameter (Da) is described below:

<Measurement Method>

Methanol is used as a medium for measurement with the use of MASTERSIZER 2000 (laser diffraction type particle size distribution meter). Before the measurement, in order to suspend homogeneously the surface treated calcium carbonate filler for resins of the present invention, as a pretreatment, an ultrasonic dispersion machine (manufactured by Nihonseiki Kaisha Ltd.) is used for preliminary dispersion under constant condition of 400 μA for 6 minutes.

The formula (c) defines the BET specific surface area (Sw) of the surface treated calcium carbonate filler for resins of the present invention, and Sw is preferably in the range of from 3 to 60 m$^2$/g. In the case the specific surface area (Sw) is less than 3 m$^2$/g, the primary particles are too large and form pores larger than desired pores when it is added to a porous filtration filter. On the other hand, if it exceeds 60 m$^2$/g, a problem may occur to obtain the void diameter that is desired in terms of the dispersibility. Accordingly, it is more preferably in the range of from 3 to 30 m$^2$/g, still more preferably in the range of from 5 to 20 m$^2$/g, and particularly preferably in the range of from 7 to 15 m$^2$/g.

The formula (d) represents surface treatment ratio (As) of the surface treated calcium carbonate filler for resins of the present invention, i.e., heat loss per unit specific surface area of the filler.

As described above, the amount of the surface treatment agent varies depending on specific surface area of calcium carbonate particles or type of the surface active agent. Thus, though the surface treatment ratio (As) cannot be defined uniformly, but in general, the amount is preferably 0.05 to 0.3 mg/m$^2$. If the surface treatment ratio (As) is less than 0.05 mg/m$^2$, it is difficult to obtain a sufficient dispersion effect.

On the other hand, even if it exceeds 0.3 mg/m², it is difficult to obtain an additional improving effect and also the surface treatment agent component or the resin component may be released due to use of an excess amount of a treatment agent. Thus, it is more preferably 0.1 to 0.3 mg/m², and still more preferably 0.15 to 0.25 mg/m².

The measurement method of the surface treatment ratio (As) is given below:

<Measurement Method>

Using a thermobalance (TG-8110 model, manufactured by Rigaku Corporation), 100 mg of a surface treated calcium carbonate filler is put in a platinum container with a diameter of 10 mm and a volume of 0.5 ml, the heat loss is measured by heating at a temperature increase rate of 15° C./minute in a temperature range from 200° C. to 500° C., the heat loss (mg/g) per 1 g of the surface treated calcium carbonate filler is obtained, and the obtained value is divided by the BET specific surface area.

Next, the resin composition of the present invention is explained.

The resin to be used in the present invention is not particularly limited, and may include, for example, polyester resins (PET, PBT, PEN, PC, PLA), polyolefin resins including polyethylene resins (PE, HDPE, LDPE, EVA, EVOH, EEA, UHMW-PE), polypropylenes (PP), polypropylene-ethylene copolymers, and copolymers of ethylene or propylene with other monomers, polyvinyl resins (PVC, PVDC, PVA), styrene resins (PS, MS, AS, ABS), polyether resins (POM, PPE, PSF, PES, PPS, PEI), acrylic resins (PMMA), liquid crystal polymers (LCP), polyamide resins (PA6, PA6-6, PA6T, PA9T, aramid), biodegradable resins, and thermosetting resins (phenol, melamine, epoxy). It may be used either singly or in combination of two or more, if necessary.

Further, when it is used for a porous film for light reflection, polyolefin resins like polyethylene (PE), polypropylene (PP), and polypropylene-ethylene copolymer are preferable in that brightness is insignificantly reduced and more stable with time, the resin itself has flexibility, and a light guide plate is resistant to scratch, and are also preferable in terms of cost.

The mixing ratio of the surface treated calcium carbonate filler for resins of the present invention and the above resins is not particularly limited, and considerably differs in accordance with the types and uses of the resins, desired physical properties and the cost, and may be properly determined in accordance with these factors. In the case of uses for the separator film for a battery, the amount is usually 100 to 380 parts by weight and preferably about 130 to 330 parts by weight per 100 parts by weight of the resin.

Further, when it is used for a battery separator, polyolefin resins like polypropylene and polyethylene (PE) having a shut-down property are preferable. Among them, ultra high molecular weight polyethylene (UHMW-PE) which has high molecular weight and excellent film strength, durability, and chemical resistance is more preferable.

The mixing ratio of the surface treated calcium carbonate filler for resins of the present invention and the above resins is not particularly limited, and considerably differs in accordance with the types and uses of the resins, desired physical properties and the cost, and may be properly determined in accordance with these factors. However, the amount is usually 60 to 150 parts by weight and preferably about 80 to 120 parts by weight per 100 parts by weight of the resin.

In order to improve the properties of the film, if necessary, a lubricating agent like a metal soap, fatty acid amides, ethylene bisstearic acid amide, and sorbitan fatty acid esters, a plasticizer, a stabilizer, and an antioxidant and the like may be added to an extent that the effect of the surface treated calcium carbonate filler for resins of the present invention is not interfered. Further, it is also possible to add additives commonly used for a resin composition for a film such as a lubricant, an antioxidant, a heat stabilizer, a photostabilizer, a UV absorbent, a neutralization agent, an anti-fogging agent, an anti-blocking agent, an anti-static agent, a slipping agent, and a coloring agent.

In the case the surface treated calcium carbonate filler for resins of the present invention and the above-mentioned various kinds of additives are mixed with a resin, a mixer known in the field like a Henschel mixer, a tumbler type mixer, and a ribbon blender is used for mixing.

The resin may be in the form of pellets, powders (granules) with a particle size adjusted to a desired level, and from the view point of dispersibility of the particles, it is preferable to use a powder-state resin.

After mixing in a mixer, the resin composition is heated and kneaded by a monoaxial or biaxial extruder, a kneader, or a Banbury mixer, and first formed into pellets containing the surface treated calcium carbonate filler for resins of the present invention and various fillers, which are called a master batch. By using a conventionally known molding machine like a T die and an inflation molding machine, it is melted and formed into a film. After that, if necessary, it is stretched monoaxially or biaxially to produce a film product having homogenous and fine pore diameter.

Further, if necessary, it is also possible that the process until T die extrusion in the process described above is set to multiple numbers so that a film with a multilayer structure is formed by extrusion molding, the films are adhered to each other during stretching followed by a further stretching process to produce a multilayer film, or the film is aged at a temperature which is higher than room temperature but lower than the melting temperature of the resin.

Further, in order to give a proper printing property to the film, an ink-receiving layer may be formed on the film surface by a surface treatment like plasma discharge or the like, and it is also possible to coat at least one side of the film with, as a protective layer, an organic solvent coating solution containing a heat resistant resin (aromatic para-aramid, polyphenylene sulfide, and polyether ether ketone (PEEK) resin, or the like).

Further, it is also possible to dissolve the surface treated calcium carbonate filler for resins of the present invention by an acid treatment to provide a porous film product having fine pores.

EXAMPLES

The present invention will be described in greater detail with reference to the Examples, however, it is not intended that the present invention is limited to these Examples.

Meanwhile, in the following description, % and part(s) mean % by weight and part(s) by weight, respectively, unless specifically described.

Example 1

A quick lime obtained by firing a gray and dense limestone in a furnace type kiln using kerosene as a heat source was dissolved to obtain a slaked lime slurry and reaction with carbonic acid gas was carried out to synthesize calcium carbonate. The obtained water slurry containing the calcium carbonate was sieved with a sieve to remove foreign matters and coarse particles and thereafter, the resulting calcium carbonate slurry was subjected to particle growth by Ostwald aging to obtain a water slurry containing 10% of calcium carbonate with a BET specific surface area of 13 m²/g.

Next, lauric acid soap (trade name: LK-2, manufactured by NOF Corporation) as the surface active agent (A) and phosphonic acid (trade name: Dequest 2000, manufactured by ThermPhos International B.V.) as the chelating compound (B) having a chelating ability to alkaline earth metals in amounts of 2.5% and 0.5%, respectively, to the amount of the calcium carbonate solid matter, were used for surface treatment to obtain a slurry of surface treated calcium carbonate.

Thereafter, dehydration, drying, and pulverization treatments were carried out and the obtained dry powder was further classified by a fine air classification apparatus (Turbo Classifier) to obtain a surface treated calcium carbonate filler. Various physical properties of the surface treated calcium carbonate filler obtained are summarized in the Table 1.

Example 2

The same process as the process of the Example 1 was carried out to obtain a surface treated calcium carbonate filler except that the surface active agent (A) was changed to 3.8% of stearic acid soap (trade name: SK-1, manufactured by NOF Corporation). Various physical properties of the obtained surface treated calcium carbonate filler are shown in the Table 1.

Example 3

The same process as the process of the Example 1 was carried out to obtain a surface treated calcium carbonate filler except that the chelating compound (B) was changed to sodium phosphonate (trade name: Dequest 2006, manufactured by ThermPhos International B.V.). Various physical properties of the obtained surface treated calcium carbonate filler are shown in the Table 1.

Example 4

The same process as the process of the Example 1 was carried out to obtain a surface treated calcium carbonate filler except that the surface active agent (A) was changed to an unsaturated fatty acid soap (trade name: Marcel soap, manufactured by NOF Corporation). Various physical properties of the obtained surface treated calcium carbonate filler are shown in the Table 1.

Example 5

The same process as the process of the Example 1 was carried out to obtain a surface treated calcium carbonate filler except that the chelating compound (B) was changed to polycarboxylic acid (trade name: AKM-0531, manufactured by NOF Corporation). Various physical properties of the obtained surface treated calcium carbonate filler are shown in the Table 1.

Example 6

Based on the same process as the process of the Example 1, Ostwald aging was carried out to obtain a water slurry containing 10% of calcium carbonate with a BET specific surface area of 18 m²/g.

Next, stearic acid soap (trade name: SK-1, manufactured by NOF Corporation) as the surface active agent (A) and phosphonic acid (trade name: Dequest 2000, manufactured by ThermPhos International B.V.) as the chelating compound (B) in amounts of 4.5% and 3.2%, respectively, to the amount of the calcium carbonate solid matter, were used for surface treatment and subjected to the same process as the process of the Example 1 to obtain a surface treated calcium carbonate filler. Various physical properties of the surface treated calcium carbonate filler obtained are summarized in the Table 1.

Example 7

Based on the same process as the process of the Example 1, Ostwald aging was carried out to obtain a water slurry containing 10% of calcium carbonate with a BET specific surface area of 22 m²/g.

Next, an unsaturated fatty acid soap (trade name: Marcel soap, manufactured by NOF Corporation) as the surface active agent (A) and phosphonic acid (trade name: Dequest 2000, manufactured by ThermPhos International B.V.) as the chelating compound (B) in amounts of 6.0% and 1.5% respectively, to the amount of the calcium carbonate solid matter, were used for surface treatment and subjected to the same process as the process of the Example 1 to obtain a surface treated calcium carbonate filler. Various physical properties of the surface treated calcium carbonate filler obtained are summarized in the Table 1.

Example 8

The same process as the process of the Example 1 was carried out to obtain a calcium carbonate slurry with a BET specific surface area of 35 m²/g except that citric acid as a particle growth inhibitor for calcium hydroxide was added in an amount of 1.0% when calcium carbonate was synthesized by reacting quick lime slurry and carbonic acid gas, and that the addition amounts of the surface active agent (A) and the chelating compound (B) were changed to 10% and 2.0%, respectively, and a surface treated calcium carbonate filler was also obtained accordingly. Various physical properties of the obtained surface treated calcium carbonate filler are shown in the Table 1.

Example 9

The same process as the process of the Example 1 was carried out to obtain a calcium carbonate slurry with a BET specific surface area of 57 m²/g except that citric acid as a particle growth inhibitor was added in an amount of 3.0%, and that the addition amounts of the surface active agent (A) and the chelating compound (B) were changed to 18.5% and 2.5%, respectively, and a surface treated calcium carbonate filler was also obtained accordingly. Various physical properties of the obtained surface treated calcium carbonate filler are shown in the Table 1.

Example 10

The same process as the process of the Example 1 was carried out to obtain a surface treated calcium carbonate filler except that the addition amount of phosphonic acid (trade name: Dequest 2000, manufactured by ThermPhos International B.V.) as the chelating compound (B) was changed to 0.1%. Various physical properties of the obtained surface treated calcium carbonate filler are shown in the Table 1.

Comparative Example 1

The same process as the process of the Example 1 was carried out to obtain a surface treated calcium carbonate filler except that the mixed treatment agent A1, which was prepared separately to have the composition described below, as the surface active agent (A) and condensed phosphoric acids (trade name: sodium hexametaphosphoric acid, manufactured by RASA Industries, Ltd) as the chelating compound (B) in amounts of 2.5% and 0.5%, respectively, to the amount of the calcium carbonate solid matter, were used for surface treatment. Various physical properties of the surface treated calcium carbonate filler obtained are summarized in the Table 2.

Mixed Treatment Agent A1

| | |
|---|---|
| Potassium stearate | 60% |
| Sodium oleate | 8% |
| Sodium palmitate | 20% |
| Sodium myristate | 2% |
| Sodium laurate | 10% |

Comparative Example 2

The same process as the process of the Comparative Example 1 was carried out to obtain a surface treated calcium carbonate filler except that the chelating compound (B) was changed to aluminum polychloride. Various physical properties of the obtained surface treated calcium carbonate filler are shown in the Table 2.

Comparative Example 3

As described in the Example 1 of WO 2004/035476, 5% of calcium carbonate (1.492 kg) which was obtained by reacting a theoretical amount of citric acid (i.e., chelating agent: pKa of 3.16 with Ca ions) was added to 10 kg of a 11.8% water suspension of calcium hydroxide and 100% carbonic acid gas was injected thereto at a rate of 12 L/min under vigorous stirring for carbonation. The reaction was completed when pH was 7.8. Meanwhile, when viscosity of the system reached its maximum during the carbonation reaction, 2 kg of water was added.

The calcium carbonate suspension obtained was dried by using a spray dryer, and after pulverization using an impact type pin mill Coroflex (manufactured by Alpine Electronics, Inc.), stearic acid was added in an amount of 9% based on calcium carbonate by using a Henschel mixer. After carrying out the surface treatment at 115° C. and pulverization, a surface, treated calcium carbonate filler was obtained. Various physical properties of the obtained surface treated calcium carbonate filler are shown in the Table 2.

Comparative Example 4

The same process as the process of the Example 1 was carried out to obtain a calcium carbonate slurry with a BET specific surface area of 13 $m^2/g$, and dehydration, drying, and pulverization treatments were carried out for the slurry to obtain a non-surface treated calcium carbonate filler. Various physical properties of the non-treated calcium carbonate filler obtained are summarized in the Table 2.

Comparative Example 5

The same process as the process of the Example 1 was carried out to obtain a surface treated calcium carbonate filler except that the surface active agent (A) was changed to 2.5% of lauric acid soap (trade name: LK-2, manufactured by NOF Corporation). Various physical properties of the obtained surface treated calcium. carbonate filler are shown in the Table 2.

(Test for Measuring Weatherability and Stability with Time)

Each cycle includes maintaining the calcium carbonate filler obtained in the Examples 1 to 10 and the Comparatives Examples 1 to 5 under the conditions of 40° C.×80% RH for 12 hours and 23° C.×50% RH for 12 hours, alternately. After performing seven cycles (i.e., one week), the particle size distribution was measured by using a laser diffraction type particle size analyzer MASTERSIZER 2000 (manufactured by Malvern Instruments Ltd). That is, powder physical properties of the calcium carbonate filler (e.g., average particle diameter D50, amount of particles of more than 1 μm, and maximum particle diameter) were measured. Various physical properties of the obtained surface treated calcium carbonate filler are shown in the Table 1 and the Table 2.

Compared to the filler immediately after the production, each of the surface treated calcium fillers obtained in the Comparative Examples 1 to 3 and 5 showed high variation in powder physical properties (e.g., average particle diameter D50, amount of coarse particles, and maximum particle diameter) after the test for measuring weatherability and stability with time, i.e., after repeating storage at temperature and humidity mimicking those of a rainy season, and it also showed deteriorated physical properties like agglomeration.

On the other hand, for each of the calcium carbonate powders of the Examples 1 to 10, almost no change was observed before and after the test for measuring weatherability and stability with time.

Examples 11 to 20 and Comparative Examples 6 to 10

A resin mixture was produced by mixing 100 parts of a polyethylene resin (HI-ZEX MILLION 340M, manufactured by Mitsui Chemicals, Inc.), 50 parts of a polyethylene wax (Hi-WAX 110 P, manufactured by Mitsui Chemicals, Inc.), and 300 parts of the calcium carbonate filler of the Examples 1 to 10 or the Comparative Examples 1 to 5, that were obtained after weatherability and stability with time test, were charged into a Henschel mixer and mixed for 3 minutes to obtain a resin composition.

The obtained resin composition was subjected to melting and kneading treatment by using a biaxial kneader 2D25W manufactured by Toyo Seiki Co., Ltd. to obtain pellets. Subsequently, the pellets obtained were subjected to melting and kneading treatment and film formation by using a biaxial kneader 2D25W provided with a T-die manufactured by Toyo Seiki Co., Ltd. to give a film with a thickness of 100 μm.

The obtained film was stretched about 5 times in the longitudinal direction at 110° C. in a tenter oven to obtain a porous film.

Various physical properties were evaluated in the method described below for the each porous film obtained. The results are described in the Table 3 and the Table 4.

1) Gurley Ventilation Degree

The Gurley value of each porous film was measured by B type densometer manufactured by Toyo Seiki Co., Ltd. according to JIS-P8117. The larger the Gurley ventilation degree becomes, the higher the permeability of gas or ions is, and that is therefore preferable.

The Gurley ventilation degree is generally in proportion to the fine pore diameter of the porous film. If there is a problem like a damage in the separator surface, the Gurley value becomes high, and in the case pin holes are formed or film pressure is lowered, the Gurley value is low. and thus, both are undesirable. Consequently, the range of the Gurley value is generally 50 to 500 (sec./100 mL) and preferably 100 to 300 (sec./100 mL). In the case the value is out of the above-mentioned range, there is possibly a problem.

2) Puncture Strength

The porous film fixed on a washer with a diameter of 12 mm was punctured at a rate of 200 mm/minute with a metal needle, which has a diameter of 1 mm and a needle tip curvature radius of 0.5 mm. The maximum load until hole opening occurs was measured to determine the puncture strength value (gf).

3) Cycle Property of Lithium Secondary Battery

A mixture containing an anode active material ($LiMn_2O_4$) and a conductive agent (acetylene black) was used as a positive electrode and a metal Li applied in a thick layer to a Ni mesh was used as a negative electrode, and the porous film was sandwiched between the positive electrode and the negative electrode, and using a Constant Current Discharge and Charge Testing Equipment (BTS 2004H, manufactured by NAGANO & CO., Ltd.), measurement was carried out. As an electrolytic solution, a $LiClO_4$ electrolytic solution (PC/DMC organic solvent) was used and the current charge and discharge conditions were 0.9 mA, 3.5 to 4.3 V, and 1000 measurement cycles.

Based on the charge capacity and the discharge capacity at the 1st measurement cycle and the 1000th cycle, the charge and discharge cycle property was evaluated according to the following criteria:

5 points: extremely stable in charge and discharge capacity and capacity decrease, 4 points: stable in charge and discharge capacity and capacity decrease, 3 points: within allowable range of charge and discharge capacity and capacity decrease, 2 points: there is a problematic portion in charge and discharge capacity and capacity decrease, and 1 point: inferior in charge and discharge capacity and capacity decrease.

4) Film Thickness

Film thickness of a porous film was measured by using a film thickness tester. When the film is thin, it is advantageous from the view point of ion permeability. However, as it has a weak insulating property between the electrodes and weak puncture strength, a film with larger thickness is preferable as long as good ion permeability is maintained.

5) Number of Defects

Defects with a size of 0.5 $mm^2$ or more in a porous film like non-melted polymer gel, agglomerated filler, or foreign matters were counted with a naked eye. After counting the defects in 50 $m^2$, the average value per 1 $m^2$ was taken as the number of defects.

Examples 21 to 30 and Comparative Examples 11 to 15

A resin mixture was produced by mixing 100 parts of a polypropylene resin (FS2011DG2 manufactured by Sumitomo Chemical Co., Ltd., MI=2.0 g/10 minute), 110 parts of the calcium carbonate filler of the Examples 1 to 10 or the Comparative Examples 1 to 5, that were obtained after weatherability and stability with time test, 1 part of calcium stearate, and 1 part of a hindered amine photo stabilizer were charged into a Henschel mixer and the mixture was mixed for 5 minutes to obtain a resin composition.

The obtained resin composition was subjected to melting and kneading by using a biaxial kneader 2D25W manufactured by Toyo Seiki Co., Ltd. to obtain pellets. Subsequently, the pellets obtained were subjected to melting and kneading and film formation by using a biaxial kneader 2D25W provided with a T-die manufactured by Toyo Seiki Co., Ltd. to obtain an unstretched sheet. The obtained unstretched sheet was stretched about 7 times at 140° C. in a tenter oven to give a stretched porous sheet with a thickness of 180 μm.

Thereafter, by using a gravure coater, the stretched porous sheet was coated with polyester-based hot-melt type adhesives to a thickness of 7 μm. The porous sheet coated with the adhesives was laminated at a temperature of 75° C. with an aluminum sheet having a thickness of 200 μm as a plate shape support to thereby obtain a light reflector.

The light reflector obtained was subjected to the following durability test and the diffuse reflectance, brightness variation, and color change were measured and evaluated before and after the durability test according to the method described below. The evaluation results are described in the Table 5 and the Table 6.

1) Diffuse Reflectance

Diffuse reflectance was measured for the wavelength range of 400 to 1000 nm by using a spectrophotometer (UV3101PC manufactured by Shimadzu Corporation), and the diffuse reflectance at 550 nm was taken as the representative value.

It can be said that, the higher the diffuse reflectance becomes, the better the color of a light reflector is. Meanwhile, the change ratio is obtained according to the following equation and the smaller values indicate better results.

Change ratio (%)=(Diffuse reflectance before durability test—Diffuse reflectance after durability test)/Diffuse reflectance before durability test 2) Durability Test The durability test was carried out based on JIS K7350-2 by using a Xenon Weather Meter (SX75 manufactured by Suga Test Instruments Co., Ltd.) with illumination for 144 hours under conditions including wavelength=300 to 400 nm, irradiance=180 $W/m^2$, black panel temperature=83° C., and humidity=50% RH.

3) Brightness Variation

For measurement of brightness variation, a 24 inch direct-lighting type surface light source display device was used as illustrated in FIG. 1.

The surface light source display device in which the light deflector 1 molded as a reflector was used, and a cold cathode lamp 2 and a LCD cell 3 were installed in the inside and the front side of the device, respectively. The device was lighted and illuminated with light and an occurrence of brightness variation in the front direction was evaluated with a naked eye based on the following criteria:

◯: Even brightness without any variation is observed,

Δ: Slight variation in brightness is observed, and x: Variation is observed.

4) Color Change

Discoloration (yellowing) during continuous lighting was evaluated as follows: using a solar simulator YSS-150A (manufactured by Yamashita Denso Corporation), light illumination was carried out for 24 hours at an illumination strength of 500 mw/$cm^2$ with a xenon lamp which was installed 10 cm away from the surface of a light reflector, and the color change of the light reflector was measured by reading the color difference ΔEH (JIS-Z-8730), which was obtained from the index values that were measured before and after the durability test, using a color difference machine (S&M color computer, manufactured by Suga Test Instruments Co., Ltd). Thereafter, the evaluation was made based on the following criteria:

⊙: There was absolutely no color change and very favorable color was obtained (ΔEH<0.3), ○: There was no color change and favorable color was obtained (0.3≤ΔEH<1), and.

x: There was a color change and poor color was obtained (ΔEH≥1).

TABLE 1

|  |  | Example 1 | Example 2 | Example 3 | Example 4 | Example 5 |
|---|---|---|---|---|---|---|
| Surface active agent (A) |  | Saturated fatty acid | Saturated fatty acid | Saturated fatty acid | Unsaturated fatty acid | Saturated fatty acid |
| Addition amount | [%] | 2.5 | 3.8 | 2.5 | 2.5 | 2.5 |
| Chelate compound (B) |  | Phosphonic acid | Phosphonic acid | Sodium phosphonate | Phosphonic acid | Polycarboxylic acid |
| Addition amount | [%] | 0.5 | 0.5 | 0.5 | 0.5 | 0.5 |
| Average particle diameter D50 | [μm] | 0.26 | 0.28 | 0.29 | 0.30 | 0.36 |
| Amount of particles of more than 1 μm | [%] | 0.0 | 0.0 | 0.7 | 3.1 | 4.7 |
| Maximum particle diameter Da | [μm] | 0.83 | 0.83 | 1.10 | 1.45 | 1.91 |
| BET specific surface area Sw | [$m^2/g$] | 13 | 13 | 13 | 13 | 13 |
| Surface treatment ratio As | [$m^2/g$] | 0.176 | 0.238 | 0.174 | 0.172 | 0.175 |
| After test for weatherability and stability with time |  |  |  |  |  |  |
| Average particle diameter D50 | [μm] | 0.27 | 0.28 | 0.29 | 0.37 | 0.40 |
| Amount of particles of more than 1 μm | [%] | 0.0 | 0.0 | 0.8 | 5.2 | 6.1 |
| Maximum particle diameter Da | [μm] | 0.83 | 0.96 | 1.10 | 1.46 | 1.91 |

|  |  | Example 6 | Example 7 | Example 8 | Example 9 | Example 10 |
|---|---|---|---|---|---|---|
| Surface active agent (A) |  | Saturated fatty acid | Unsaturated fatty acid | Saturated fatty acid | Unsaturated fatty acid | Saturated fatty acid |
| Addition amount | [%] | 4.5 | 6 | 10 | 18.5 | 2.5 |
| Chelate compound (B) |  | Phosphonic acid | Phosphonic acid | Phosphonic acid | Phosphonic acid | Phosphonic acid |
| Addition amount | [%] | 3.2 | 1.5 | 2.0 | 2.5 | 0.1 |
| Average particle diameter D50 | [μm] | 0.41 | 0.37 | 0.61 | 1.14 | 0.28 |
| Amount of particles of more than 1 μm | [%] | 4.1 | 4.3 | 7.6 | 15.1 | 0.3 |
| Maximum particle diameter Da | [μm] | 1.66 | 2.2 | 3.8 | 11 | 1.10 |
| BET specific surface area Sw | [$m^2/g$] | 18 | 22 | 35 | 57 | 13 |
| Surface treatment ratio As | [$m^2/g$] | 0.217 | 0.241 | 0.257 | 0.298 | 0.175 |
| After test for weatherability and stability with time |  |  |  |  |  |  |
| Average particle diameter D50 | [μm] | 0.45 | 0.43 | 0.82 | 2.27 | 0.29 |
| Amount of particles of more than 1 μm | [%] | 7.2 | 6.7 | 10.8 | 23.1 | 0.4 |
| Maximum particle diameter Da | [μm] | 3.24 | 3.31 | 8.7 | 17 | 1.10 |

TABLE 2

|  |  | Comp. Ex. 1 | Comp. Ex. 2 | Comp. Ex. 3 | Comp. Ex. 4 | Comp. Ex. 5 |
|---|---|---|---|---|---|---|
| Surface active agent (A) |  | Mixed soap | Mixed soap | Stearic acid | Not used | Saturated fatty acid |
| Addition amount | [%] | 2.5 | 2.5 | 9 |  | 2.5 |
| Chelate compound (B) |  | Condensed phosphoric acid | Aluminum polychloride | Citric acid (chemically synthesized) | Not used | Not used |
| Addition amount | [%] | 0.5 | 0.5 | 5.0 |  |  |
| Average particle diameter D50 | [μm] | 0.33 | 0.41 | 2.03 | 4.72 | 0.56 |
| Amount of particles of more than 1 μm | [%] | 17.0 | 19.3 | 68.3 | 82.5 | 19.1 |

TABLE 2-continued

|  |  | Comp. Ex. 1 | Comp. Ex. 2 | Comp. Ex. 3 | Comp. Ex. 4 | Comp. Ex. 5 |
|---|---|---|---|---|---|---|
| Maximum particle diameter Da | [µm] | 15 | 17 | 20 | 39 | 30 |
| BET specific surface area Sw | [m$^2$/g] | 13 | 13 | 92 | 13 | 13 |
| Surface treatment ratio As | [m$^2$/g] | 0.173 | 0.171 | 0.146 | 0.020 | 0.169 |
| After test for weatherability and stability with time |  |  |  |  |  |  |
| Average particle diameter D50 | [µm] | 0.55 | 0.61 | 3.49 | 4.79 | 0.87 |
| Amount of particles of more than 1 µm | [%] | 38.7 | 46.5 | 81.5 | 83.7 | 31.6 |
| Maximum particle diameter Da | [µm] | 26 | 30 | 22 | 39 | 35 |

TABLE 3

|  |  | Example 11 | Example 12 | Example 13 | Example 14 | Example 15 | Example 16 | Example 17 | Example 18 | Example 19 | Example 20 |
|---|---|---|---|---|---|---|---|---|---|---|---|
| Filler used (after test for weatherability and stability with time) |  | Example 1 | Example 2 | Example 3 | Example 4 | Example 5 | Example 6 | Example 7 | Example 8 | Example 9 | Example 10 |
| Gurley ventilation degree | [sec./100 ml] | 230 | 230 | 230 | 190 | 200 | 190 | 120 | 110 | 100 | 210 |
| Puncture strength | [gf] | 460 | 430 | 410 | 290 | 350 | 280 | 210 | 200 | 200 | 390 |
| Cycle property |  | 5 | 5 | 4 | 4 | 3 | 3 | 2 | 2 | 2 | 4 |
| Film thickness | [µm] | 30 | 29 | 29 | 28 | 30 | 31 | 30 | 32 | 30 | 30 |
| Number of defects | [pieces/m$^2$] | 0 | 0 | 0 | 1 | 2 | 1 | 5 | 7 | 6 | 2 |

TABLE 4

| Filler used (after test for weatherability and stability with time) |  | Comp. Ex. 6 Comp. Ex. 1 | Comp. Ex. 7 Comp. Ex. 2 | Comp. Ex. 8 Comp. Ex. 3 | Comp. Ex. 9 Comp. Ex. 4 | Comp. Ex. 10 Comp. Ex. 5 |
|---|---|---|---|---|---|---|
| Gurley ventilation degree | [sec./100 ml] | 40 | 80 | 30 | 20 | 70 |
| Puncture strength | [gf] | 100 | 150 | 90 | 70 | 180 |
| Cycle property |  | 1 | 1 | 1 | 1 | 1 |
| Film thickness | [µm] | 31 | 30 | 32 | 30 | 30 |
| Number of defects | [pieces/m$^2$] | 21 | 15 | 61 | 127 | 84 |

TABLE 5

|  | Example 21 | Example 22 | Example 23 | Example 24 | Example 25 | Example 26 | Example 27 | Example 28 | Example 29 | Example 30 |
|---|---|---|---|---|---|---|---|---|---|---|
| Filler used | Example 1 | Example 2 | Example 3 | Example 4 | Example 5 | Example 6 | Example 7 | Example 8 | Example 9 | Example 10 |
| Diffuse reflectance |  |  |  |  |  |  |  |  |  |  |
| before durability test [%] | 95.5 | 94.9 | 94.7 | 93.4 | 94.2 | 93.1 | 92.7 | 91.6 | 90.8 | 94.1 |
| after durability test [%] | 95.3 | 94.6 | 93.5 | 89.8 | 91.5 | 89.6 | 87.6 | 86.5 | 85.3 | 91.4 |
| change ratio [%] | 0.21 | 0.32 | 1.27 | 3.85 | 2.87 | 3.76 | 5.50 | 5.57 | 6.06 | 2.87 |
| Brightness variation [—] | ○ | ○ | ○ | ○ | ○ | ○ | Δ | Δ | Δ | ○ |
| Color change ΔEH [—] | 0.21 | 0.23 | 0.34 | 0.65 | 0.55 | 0.41 | 0.71 | 0.88 | 0.88 | 0.43 |
| Evaluation | ◎ | ◎ | ○ | ○ | ○ | ○ | ○ | ○ | ○ | ○ |

TABLE 6

|  |  |  | Comp. Ex. 11 Comp. Ex. 1 | Comp. Ex. 12 Comp. Ex. 2 | Comp. Ex. 13 Comp. Ex. 3 | Comp. Ex. 14 Comp. Ex. 4 | Comp. Ex. 15 Comp. Ex. 5 |
|---|---|---|---|---|---|---|---|
| Diffuse reflectance | before durability test | [%] | 88.5 | 88.3 | 86.1 | 84.5 | 86.9 |
|  | after durability test | [%] | 83.7 | 85.5 | 81.3 | 79.4 | 82.4 |
|  | change ratio | [%] | 5.42 | 3.17 | 5.57 | 6.04 | 5.18 |
| Brightness variation |  | [−] | x | x | x | x | x |
| Color change Δ EH |  | [−] | 1.14 | 1.06 | 1.23 | 1.56 | 1.13 |
| Evaluation |  |  | x | x | x | x | x |

INDUSTRIAL APPLICABILITY

As described above, the surface treated calcium carbonate filler for resins of the present invention is very stable and exhibits little deterioration with time and favorable dispersibility in resins. Further, the resin composition added with the surface treated calcium carbonate for resins of the present invention can be used for providing a sheet or film which has a satisfactory balance among durability, weatherability, strength, and thermal stability. Thus, the sheet or film is useful as a battery separator or a light reflector.

The invention claimed is:

1. A surface treated calcium carbonate filler for polyolefin resins having durability, weatherability and stability with time, which comprises calcium carbonate particles, the surface of which has been treated with at least one surface active agent (A) selected from the group consisting of the saturated fatty acids capric acid, lauric acid, myristic acid, palmitic acid and stearic acid, the unsaturated fatty acids oleic acid, linoleic acid and linolenic acid, and salts thereof and with at least one compound (B) having the ability to chelate alkaline earth metals, the compound (B) being selected from the group consisting of nitrilotrismethylene phosphonic acid, aminotrimethylene phosphonic acid, phosphonobutane tricarboxylic acid, phosphonomethylethylene diamine and salts thereof, said filler having an average particle diameter D50 of from 0.1 to 0.5 μm, a BET specific surface area Sw of from 3 to 30 m$^2$/g and a surface treatment ratio As of from 0.05 to 0.3 m$^2$/g, wherein:

D50: average particle diameter (μm) of particles in 50% cumulative total by weight from the larger particle size in particle size distribution by laser diffraction spectrometry;

Sw: BET specific surface area (m$^2$/g) measured by nitrogen adsorption method;

As: surface treatment ratio per unit specific surface area calculated according to the following formula:

{heat loss per 1 g of surface treated calcium carbonate at a temperature in the range of from 200° C. to 500° C. (mg/g)}/Sw (g/m$^2$).

2. A resin composition, comprising the surface treated calcium carbonate filler for polyolefin resins described in claim 1 in a polyolefin resin.

3. A battery separator comprising the resin composition described in claim 2.

4. A light reflector comprising the resin composition described in claim 2.

* * * * *